(12) United States Patent
Bessegato et al.

(10) Patent No.: US 11,183,939 B2
(45) Date of Patent: Nov. 23, 2021

(54) RELIABLE COMMUNICATION THROUGH A FLYBACK POWER TRANSFORMER USING A ZERO VOLTAGE SWITCHING PULSE

(71) Applicant: Infineon Technologies Austria AG, Villach (AT)

(72) Inventors: Renato Bessegato, Oberhaching (DE); Andrey Malinin, Fort Collins, CO (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/794,093

(22) Filed: Feb. 18, 2020

(65) Prior Publication Data

US 2021/0257922 A1    Aug. 19, 2021

(51) Int. Cl.
*H02M 3/335* (2006.01)
*H02M 1/08* (2006.01)

(52) U.S. Cl.
CPC ....... *H02M 3/33592* (2013.01); *H02M 1/083* (2013.01)

(58) Field of Classification Search
CPC ............. H02M 3/33592; H02M 1/083; H02M 2001/0012; H02M 3/3315; H02M 3/335; H02M 3/33569; H02M 3/33576; H02M 1/0012
See application file for complete search history.

(56) References Cited

U.S. PATENT DOCUMENTS

| | | | |
|---|---|---|---|
| 6,198,230 B1 | 3/2001 | Leeb et al. | |
| 6,496,059 B1 | 12/2002 | Nguyen | |
| 6,912,139 B2 | 6/2005 | Kernahan et al. | |
| 7,046,064 B1 | 5/2006 | Runaldue | |
| 8,194,424 B2 | 6/2012 | Stanley | |
| 9,602,015 B2 | 3/2017 | Mednik et al. | |
| 10,516,340 B1 | 12/2019 | Malinin et al. | |
| 2012/0008348 A1* | 1/2012 | Chapman .......... | H02M 7/53871 363/37 |
| 2014/0098578 A1 | 4/2014 | Halberstadt | |
| 2014/0160810 A1* | 6/2014 | Zheng ............... | H02M 3/33576 363/21.17 |

(Continued)

OTHER PUBLICATIONS

"Highly Integrated AC/DC Primary-Side Rapid Charge PWM Controller Supporting XM-Comm Technology," Dialog Semiconductor iW1790, Rev. 1.2, Apr. 2018, 7 pp.

(Continued)

*Primary Examiner* — Gary L Laxton
(74) *Attorney, Agent, or Firm* — Shumaker & Sieffert, P.A.

(57) ABSTRACT

A power converter, such as a flyback power converter, configured to send digital information from a secondary side to a primary side of the power converter and notify the secondary side that the communication has been received by the primary side. In this manner the secondary side may receive an acknowledgement (ACK) from the primary side, while maintaining isolation between the primary side and secondary side. To implement the ACK response to digital communication from the secondary side, the primary side may delay generating a PWM pulse to the primary side switch. The secondary side may detect the missing PWM pulse based on a change in the integrated secondary side current and determine that the primary side has sent an ACK response.

18 Claims, 9 Drawing Sheets

(56) References Cited

U.S. PATENT DOCUMENTS

| | | | |
|---|---|---|---|
| 2014/0204619 A1* | 7/2014 | Telefus | H02M 3/33576 |
| | | | 363/21.01 |
| 2014/0268919 A1* | 9/2014 | Yao | H02M 3/33523 |
| | | | 363/21.15 |
| 2015/0188442 A1* | 7/2015 | Kesterson | H02M 3/33523 |
| | | | 363/21.15 |
| 2015/0229224 A1* | 8/2015 | Werner | H04B 3/56 |
| | | | 363/21.13 |
| 2016/0056703 A1 | 2/2016 | Deboy et al. | |
| 2016/0056704 A1 | 2/2016 | Deboy | |
| 2017/0133929 A1 | 5/2017 | Matsuki et al. | |
| 2017/0244332 A1 | 8/2017 | Leong et al. | |
| 2017/0250612 A1 | 8/2017 | Malinin et al. | |
| 2019/0158148 A1* | 5/2019 | Bayer | H02J 50/10 |

OTHER PUBLICATIONS

"Off-Line CV/CC Flyback Switcher IC with Integrated 725 V/ 900 V MOSFET, Sync-Rect Feedback with Advanced Protection," Power Integrations, Sep. 2017, 34 pp.

"Differential Machester Encoding," accessed on Sep. 11, 2018, accessed from https://ipfs.io/ipfs/QmXoypizjW3WknFiJnKLwHCnL72vedxjQkDDP1mXWo6uco/wiki/Differential_Manchester_encoding.html, 4 pp.

"Introduction to Digital Filters," accessed on Sep. 11, 2018, accessed from http://123.physics.ucdavis.edu/week_5_files/filters/digital_filter.pdf, 15 pp.

"Planar Versus Conventional Transformer," Pulse Electronics, accessed on Sep. 11, 2018, accessed from http://www.power.pulseelectronics.com/hubfs/Transformers/Pulse-Power-BU-Planar-vs-Conventional-Transformer.pdf, 5 pp.

"ECE Tutorials," accessed on Aug. 29, 2018, accessed from http://ecetutorials.com/electrical/snubber-circuits-for-power-electronics/, 4 pp.

"Sequential Logic Circuits," accessed on Sep. 30, 2018, accessed from https://www.electronics-tutorials.ws/sequential/seq_1.html, 12 pp.

Lee, "Chapter 14 Transformers," ISU EE Slide Presentation, accessed on Sep. 10, 2018, 26 pp.

Severns, "Design of Snubbers for Power Circuits," accessed on Aug. 29, 2018, accessed from http://www.cde.com/resources/technical-papers/design.pdf, 29 pp.

Mishima, et al., "A High Frequency Planar Transformer-linked ZVS DC-DC Converter with Secondary-side Phase-Shifting PWM Rectifier" 2009 13th European Conference, Sep. 2009, 9 pp.

\* cited by examiner

US 11,183,939 B2

RELIABLE COMMUNICATION THROUGH A FLYBACK POWER TRANSFORMER USING A ZERO VOLTAGE SWITCHING PULSE

TECHNICAL FIELD

The disclosure relates to power converters.

BACKGROUND

In isolated power converters it may be desirable to communicate signals from the secondary side to the primary side. Some types of communication may include synchronizing primary and secondary switch timing and communicating changes in load power demand. Some example techniques to communicate between the secondary and primary may include a separate communication channel, which may require isolation. For example, an optoisolator may be a component of a separate communication channel between a secondary side and a primary side of a power converter, with galvanic isolation. Other examples may require additional components in order to modulate existing signals that are already occurring in the power converter, such as by modulating a ringing frequency.

SUMMARY

In general, the disclosure is directed to techniques to send digital information from a secondary side of a power converter to a primary side of the power converter, such as a flyback power converter. and to notify the secondary side that the communication has been received by the primary side. In this manner the secondary side may receive an acknowledgement (ACK) from the primary side, while maintaining isolation between the primary side and secondary side. The power converter circuit of this disclosure may include stable, accurate and reliable pulse detection techniques on the primary side to detect digital communication from the secondary side. In some examples, the pulse detection techniques may include detecting zero voltage switching (ZVS) pulse or other signals generated on the secondary side of the power converter. The techniques of this disclosure may introduce a constraint that the secondary side does not skip a switching period during communications, even when providing a power to a low power load. In order to implement the ACK response from the primary side to the secondary side, the primary side may delay generating a PWM pulse to the primary side switch. The secondary side may detect the missing PWM pulse based on a change in the integrated secondary side current and interpret the missing PWM pulse as an ACK response from the primary side.

In one example, the disclosure is directed to a system comprising: an isolated power converter, a secondary side controller configured to: control a synchronous rectification (SR) switch of the power converter, wherein the secondary side controller is configured to generate a signal by controlling the SR switch and encode digital information by modulating the switching of the SR switch. The system further comprises a primary side controller configured to: control a primary side switch of the power converter with a control signal, detect the switching of the SR switch, decode the digital information based on the modulated period between the switching time of the SR switch and in response to decoding the digital information, delay the control signal for one switching period.

In another example, the disclosure is directed to a device comprising: a pulse detection circuit, decoding circuitry configured: to receive digital information based on the detected ZVS pulse, decode the digital information, wherein the device is further configured to: control a primary side switch of a power converter by sending a control signal during a switching period in response to decoding the digital information, withhold the control signal pulse for the first switching period after receiving a final bit of the digital information.

In another example, the disclosure is directed to a device comprising a secondary side controller configured to: control a synchronous rectification (SR) switch of a power converter, wherein the secondary side controller is configured to generate a signal by controlling the SR switch, and encode digital information by modulating the switching of the SR switch, monitor an output current of the power converter, detect a switching time of a primary side switch of the power converter based on the monitored output current, in response to detecting that the switching time has been delayed, determine that a primary side controller of the power converter has decoded the digital information.

In another example, the disclosure is directed to a method comprising: detecting, by a controller circuitry, an edge of a zero voltage switching (ZVS) pulse, receiving, by the controller circuitry, digital information based on the detected ZVS pulse; decoding, by the controller circuitry, the digital information based on the detected ZVS pulse; and determining whether the decoded digital information is valid digital information; in response to determining that the decoded digital information is valid digital information, delaying, by the controller circuitry a control signal for a one switching period.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
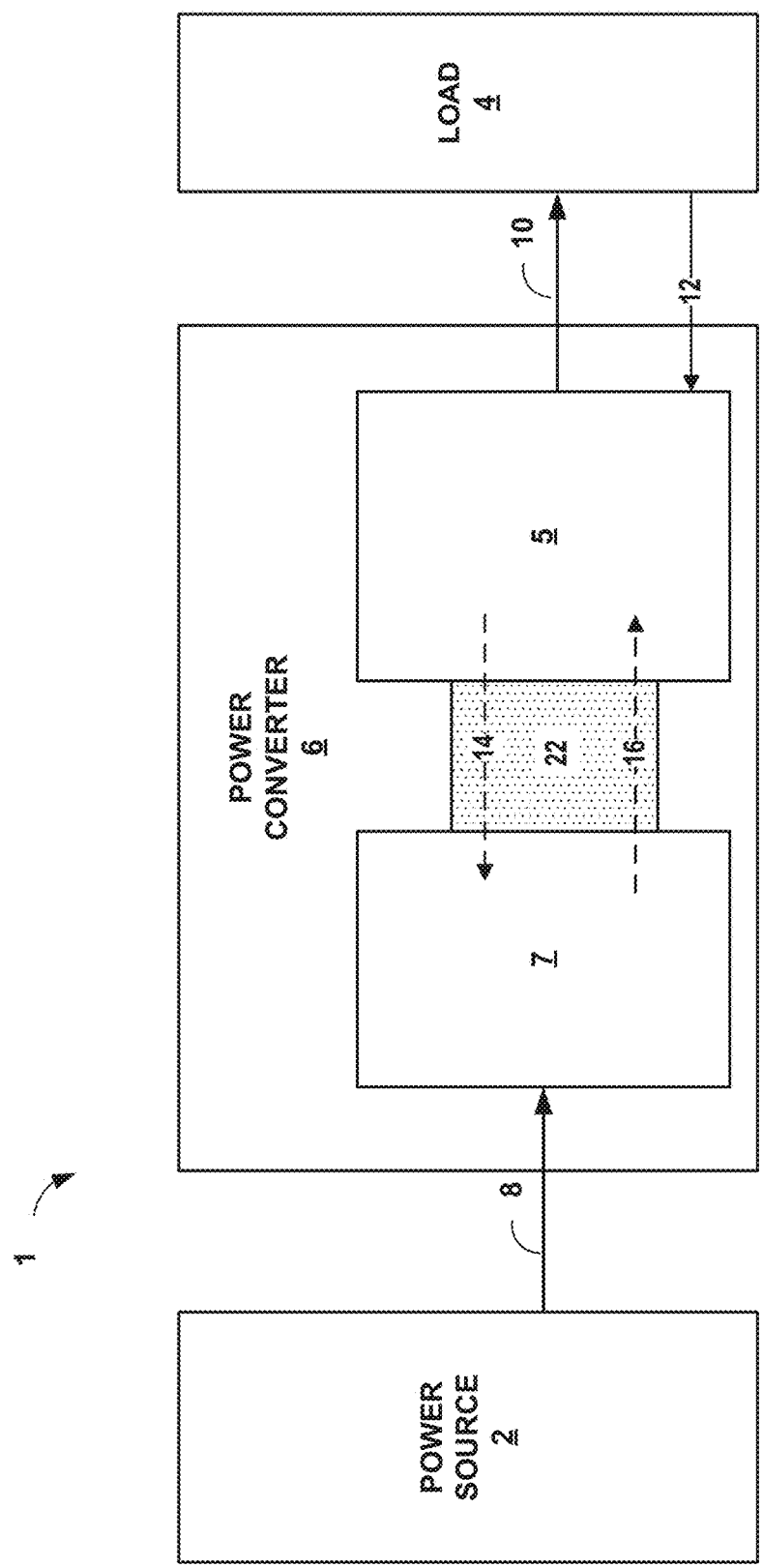
FIG. 1 is a block diagram illustrating an example system for converting power from a power source and configured to communicate between a primary side and secondary side, in accordance with one or more aspects of the present disclosure.

In general, the disclosure is directed to techniques to send digital information from a secondary side of a power converter to a primary side of the power converter, such as a flyback power converter, and to notify the secondary side that the communication has been received by the primary side. In this manner the secondary side may receive an acknowledgement (ACK) from the primary side, while maintaining isolation between the primary side and secondary side. In some examples, the secondary side does not skip a switching cycle during communications, even when providing a power to a low power load. In order to implement the ACK response from the primary side to the secondary side, the primary side may delay generating a PWM pulse to the primary side switch. The secondary side may detect the missing PWM pulse based on a change in the integrated secondary side current and interpret the missing PWM pulse as an ACK response from the primary side. The terms, "switching cycle," "switching period" and "timing period" may be used interchangeably in this disclosure.

The techniques of this disclosure take advantage of components and signals that are already used by a power converter circuit. In contrast with other techniques used to communicate between the secondary and primary side of an isolated power converter, the techniques of this disclosure do not require a separate communication channel, such as a communication channel using an opto-isolator or a lead frame-based coreless transformer. Techniques that use an additional communication device may have added cost and add complexity to the power supply design.

Other example techniques may also not require additional media and can re-use components which are already part of the power converter, such as a power transformer and SR switch. For example, some techniques rely on extending the free ringing of a discontinuous conduction mode (DCM) flyback power converter. Digital information, i.e. zeros and ones, may be encoded by the extending first or second ringing after the primary side switching cycle. However, this ringing extension technique has two deficiencies. The first is that this technique relies on a variable switching frequency, which means this technique is incompatible with the fixed frequency control systems. Second, the ringing extension technique does not support ZVS, which may be a desirable feature, such as for power converters that use planar transformers.

Other example techniques use one or more additional switches, which connects an additional capacitor parallel to the output rectifier. These additional components essentially modulate the free ringing frequency of the flyback. However, this technique may require an additional switch and a capacitor with added cost, increased footprint and increased complexity.

In contrast, the techniques of this disclosure communicate through the transformer but retain galvanic isolation between the primary side and secondary side and require no additional communication device or channel. The techniques of this disclosure also do not need additional components beyond those components already part of the power converter. Also, unlike other communication methods that communicate across the power transformer, the techniques of this disclosure support ZVS and constant frequency modes and support both DCM and continuous conduction mode (CCM) as well as a variety of primary side control techniques such peak current control or time-based pulse width modulation (PWM).

FIG. 1 is a block diagram illustrating an example system for converting power from a power source and configured to communicate a between a primary side and a secondary side, such as across a power transformer, in accordance with one or more aspects of the present disclosure. FIG. 1 shows system 1 as having four separate and distinct components shown as power source 2, power converter 6, and load 4, however system 1 may include additional or fewer components. For instance, power source 2, power converter 6, and load 4 may be four individual components or may represent a combination of one or more components that provide the functionality of system 1 as described herein.

System 1 includes power source 2 which provides electrical power to system 1. Power source 2 may be an alternating current (AC) or direct current (DC) power source. Numerous examples of power source 2 exist and may include, but are not limited to, power grids, generators, transformers, batteries, solar panels, windmills, regenerative braking systems, hydro-electrical or wind-powered generators, or any other form of devices that are capable of providing electrical power to system 1.

The example of system 1 includes power converter 6 which operates as a flyback power converter that converts one form of electrical power provided by power source 2 into a different, and usable form of electrical power for powering load 4. Power converter 6 is shown having primary side 7 separated by transformer 22 from secondary side 5. In some examples, transformer 22 may include more than one transformer or sets of transformer windings configured to transfer energy from source 2 to load 4. Using transformer 22 and the components of primary side 7 and secondary side 5, power converter 6 can convert the power input at link 8 into a power output at link 10. A flyback power converter is a type of isolated power converter.

Load 4 (also sometimes referred to herein as device 4) receives the electrical power converted by power converter 6. In some examples, load 4 may use electrical power from power converter 6 to perform a function.

Power source 2 may provide electrical power with a first voltage level and current level over link 8. Load 4 may receive electrical power that has a second voltage and current level, converted by power converter 6 over link 10. Links 8 and 10 represent any medium capable of conducting electrical power from one location to another. Examples of links 8 and 10 include, but are not limited to, physical and/or wireless electrical transmission mediums such as electrical wires, electrical traces, conductive gas tubes, twisted wire pairs, and the like. Each of links 8 and 10 provide electrical coupling between, respectively, power source 2 and power converter 6, and power converter 6 and load 4.

In the example of system 1, electrical power delivered by power source 2 can be converted by converter 6 to power that has a regulated voltage and/or current level that meets the power requirements of load 4. For instance, power source 2 may output, and power converter 6 may receive, power which has a first voltage level at link 8. Power converter 6 may convert the power which has the first voltage level to power which has a second voltage level that is required by load 4. Power converter 6 may output the power that has the second voltage level at link 10. Load 4 may receive the converted power that has the second voltage level at link 10 and load 4 may use the converted power having the second voltage level to perform a function (e.g., power a microprocessor, charge a battery, etc.). In some examples the second voltage level may by greater than, less than or approximately the same as the first voltage level.

In operation, power converter 6 may control the level of current and voltage at link 10 by exchanging information between secondary side 5 and primary side 7, via transformer 22, which is depicted by communication link 14. Communication link 14 is not a dedicated communication link. Instead, as described herein, converter 6 is configured to pass information, from secondary side 5, via transformer 22, to primary side 7. In other words, rather than include an additional, electrically isolated communication link, which may be used by other flyback converters to transfer information between two sides of a flyback, converter 6 is configured to control the switching time of an SR switch on the secondary side 5. Secondary side 5 may encode digital information by modulating a period between the switching time of the SR switch as a way to send information from secondary side 5 to primary side 7. In some examples, secondary side 5 may receive digital information from load 4, or other sources, via communication link 12. In other words, during digital communication, secondary side 5 may send digital information via a digital message to primary side 7.

In some examples, by modulating the amount of time between the edges of pulses initiated by a synchronous rectification (SR) transistor on the secondary side 5, the power converter circuit of this disclosure may communicate digital information to the primary side 7 from the secondary side 5. In some examples, the signals generated by the secondary side may be synchronized to portions of the switching cycle. For example, a signal, such as a pulse, may be synchronized to a zero crossing time, such as a zero voltage switching (ZVS) pulse. The power converter circuit of this disclosure may include stable, accurate and reliable pulse detection techniques on the primary side 7 to determine slight changes in the period between pulses from the secondary side 5. A controller circuit on the secondary side may encode digital information by modulating the pulse period, e.g. increased period, decreased period or no change to the period.

Communication link 16 shows communication in the opposite direction, from the primary side 7 to the secondary side 5. As described above for communication link 14, communication link 16 is not a separate communication link. Instead, primary side 7 may acknowledge receipt of digital communication from secondary side 5 by sending an ACK that may be detected by secondary side 5. During normal operation, in response to detecting a ZVS pulse on secondary side 5, primary side 7 may output a PWM pulse to control the current through primary side 7. Secondary side 5 may detect the PWM pulse by monitoring the current flowing through secondary side 5. However, during communication, primary side 7 may delay the output of the PWM pulse for one switching cycle. In the example of FIG. 1, secondary side 5 may detect the delayed PWM pulse based on a change, or lack of change, in the monitored secondary side current. In this disclosure, the delayed PWM pulse for one switching cycle may also be referred to as a skipped PWM pulse. In response to detecting the withheld PWM pulse, secondary side 5 may determine that the sent digital information was properly received.

In some examples, primary side 7 may not receive the digital information sent by secondary side 5, a validation code for the message may be invalid, or the primary side may not be able to interpret the digital information. Some examples of validation codes may include a cyclic redundancy check (CRC) code, Bose-Chaudhuri-Hocquenghem (BCH) error correction or other similar validation techniques. In response to an improper digital message, or if primary side 7 does not receive a message, then primary side 7 may continue normal operation. In other words, primary side 7 may output the PWM pulse in response to each detected ZVS, or other pulse from secondary side 5. In response to sending digital information, but not detecting a withheld PWM pulse, the secondary side may determine that the sent digital information was not received by primary side 7. Secondary side 5 may then re-send the digital information or take some other action. For example, after a specified number of attempts to send digital information, but receiving no ACK from primary side 7, secondary side 5 may output an error message to a system communication link. In some examples, failure to send an ACK by primary side 7 may be considered as sending a no-ACK, or NACK.

Primary side 7 may detect changes in the period between the switching time of the SR switch via transformer 22. Primary side 7 may decode the digital information based on the modulated period between the switching time of the SR switch. Some examples of digital information transferred between for example, to communicate to primary side 7, that load 4 requires additional energy from source 2, to communicate temperature and other operating parameters of load 4, or any other information that may be digitally encoded.

Figure 2:
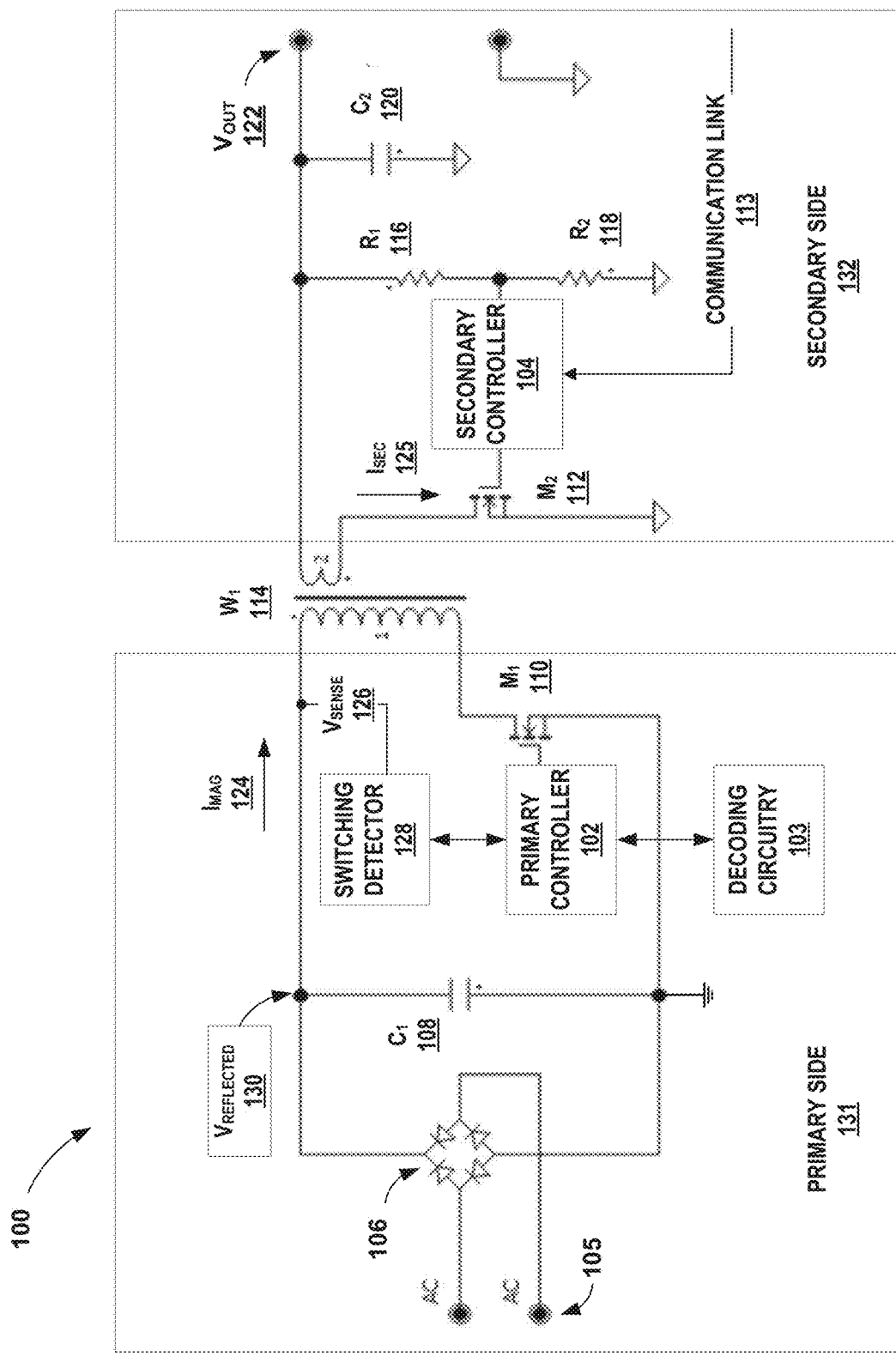
FIG. 2 is a schematic diagram illustrating an example power converter circuit according to one or more techniques of this disclosure.

FIG. 2 is a schematic diagram illustrating an example power converter circuit according to one or more techniques of this disclosure. Power converter 100 is an example of power converter 6 described above in relation to FIG. 1. The example of FIG. 2 will focus on ZVS switching to simplify the description. However, as described above in relation to FIG. 1, other types of signals generated by the secondary side may also apply to the techniques of this disclosure.

In the example of FIG. 2, power converter 100 includes a transformer, W1 114, primary side 131 and secondary side 132, similar to system 1 described above in relation to FIG. 1. For communication of digital data, this disclosure may include techniques that use an edge of an SR switch initiated ZVS pulse to send digital information from secondary side 132 to primary side 131 of power converter 100. Primary side 131 may send an ACK to secondary side 132 in response to receiving digital information. As described above in relation to FIG. 1, primary side 131 may delay a PWM pulse even though primary side 131 detected the ZVS pulse. The withheld pulse for the subsequent switching cycle may indicate an ACK to secondary side 132.

Primary side 131 includes diode rectifier 106, capacitor C1 108, Pulse detector 128, primary controller 102 and primary side switch M1 110. Rectifier 106 receives AC power from AC input terminals 105 and connects to primary side capacitor C1 108. Primary controller 102 controls the gate of primary side switch M1 110. Primary side switch connects one terminal of the primary winding of transformer W1 114 to a primary side ground node. Pulse detector 128 monitors the reflected voltage $V_{REFLECTED}$ 130 through a voltage sensing input $V_{SENSE}$ 126. Reflected voltage $V_{REFLECTED}$ 130, in the example of FIG. 2 is the output voltage $V_{OUT}$ 122 as scaled by the turns ratio of the transformer. A load across the secondary winding of a transformer appears to the primary side 131 as a reflected load having a value dependent on the reciprocal of the turns ratio squared.

Similarly, magnetizing current in the primary winding is reflected in the secondary winding and scaled by the turns ratio.

In the example of FIG. 2, primary side switch M1 110 is shown as a metal oxide semiconductor field effect transistor (MOSFET), but in other examples, primary side switch M1 110 may be implemented as a different type of switch, such as an insulated gate bipolar transistor (IGBT). In other examples, primary side 131 may be configured to receive DC power input and may not include rectifier 106.

Secondary side 132 includes SR switch M2 112, secondary controller 104, a resistor divider that includes R1 116 and R2 118, and output capacitor C2 120. A first terminal of the secondary side of transformer W1 114 connects to the output terminal, $V_{OUT}$ 122 as well as to one terminal of resistor R1 116. The opposite terminal of resistor R1 116 connects to secondary controller 104. Resistor R2 118 connects secondary controller 104 and the opposite terminal of resistor R1 116 to the secondary side ground. Secondary controller 104 monitors output voltage $V_{OUT}$ 122 through the resistor divider formed by resistors R1 116 and R2 118. Output capacitor C2 120 connects Vout 122 to the secondary side ground. In some examples, the secondary side ground may be different from the primary side ground.

Transformer W1 114 isolates primary side 131 or power converter 100 from secondary side 132 as well as steps up or steps down the secondary side voltage based on the turn ratio between the primary winding and the secondary winding. The turn ratio may define the number of electrical windings (turns) in the primary winding relative to the number of electrical windings (turns) in the secondary winding. In some examples, transformer W1 114 may also include one or more auxiliary windings (not shown in FIG. 2).

In a synchronous power converter, such as power converter 100, secondary side rectification is performed by an SR switch, such as SR switch M2 112. Synchronous rectification may also be called active rectification and may have advantages over the use of diode rectification on the secondary side of a power converter in some applications. secondary controller 104 may drive the gate pin of the SR switch M2 112 as needed to rectify the signal from the secondary side of transformer W1 114. In other words, secondary controller 104 causes SR switch M2 112 to act as a rectifier and actively turn on to allow current in one direction but actively turn off to block current from flowing the other direction, i.e. to act as an ideal diode. In some examples secondary controller 104 may be considered a SR controller.

Primary side switch M1 110 and SR switch M2 112 may be driven in a complimentary manner. In other words, when primary side switch M1 110 is ON, then SR switch M2 112 may be OFF, and vice versa. The techniques of this disclosure apply to power converters operating in either continuous conduction mode (CCM) or discontinuous conduction mode (DCM). In examples in which SR switch M2 112 is a FET and when SR switch M2 112 is off, current from the secondary winding, Isec 125, may flow through the body diode of SR switch M2 112. A body diode for a FET may have a larger voltage drop than the source-to-drain voltage when the FET is turned ON. To improve the system efficiency, SR switch M2 112 may be turned ON prior to the next switching cycle for a pre-defined period of time to allow secondary side current Isec 125 to flow with a reduced voltage drop. During the time SR switch M2 112 is turned on, some energy from output capacitor C2 120 is stored in the transformer magnetizing inductance. When SR switch M2 112 is turned OFF, the resulting magnetizing current, Imag 124 recharges the primary side parasitic capacitance, which causes primary switch M1 110 to turn ON when detecting zero voltage as measured at $V_{SENSE}$ 126. The primary side parasitic capacitance may include parasitic capacitance of the transformer, as well as parasitic drain-source capacitance (Cds) of primary switch M1 110. In other words, primary side controller 102 detects the ZVS event and initiates a switching cycle. Falling edge of a ZVS pulse at primary side 131 is consistently aligned with SR switch M2 112 turn off at secondary side 132 and can be very reliably detected by Pulse detector 128 in communication with primary side controller 102. Controlling the primary side switch M1 110 to switch ON when detecting zero volts is called ZVS operation.

For communication operation, secondary controller 104 may receive digital information to be sent from secondary side 132 to primary side 131. In some examples, secondary controller 104 may receive the information via communication link 113 from, for example a load, another processor in a system that may include power converter 100, or some other source. Communication link 113 may be implemented by signal wires, wireless link, load modulation, and similar communication techniques. Communication link 113 may carry information, including digital information, from a load, similar to communication link 12 and load 4 as described above in relation to FIG. 1. Secondary controller 104 may also receive information to encode from sources other than the load, such as from temperature sensors, from a processor (e.g. a microcontroller), or other sources. Secondary controller 104 may encode the received information into digital information by modulating a period between the switching time of the SR switch.

Secondary controller 104 may use a variety of coding schemes to encode the received information into digital information. On the primary side 131, pulse detector 128 may detect the ZVS pulse in the reflected voltage, $V_{REFLECTED}$ 130 sensed on the primary winding of power transformer W1 114. Decoding circuitry 103 may be configured to receive digital information based on the detected ZVS pulse and decode the digital information, including applying a validation algorithm to the received digital information. Though shown as separate from primary controller 102 and operatively connected to primary controller 102, in some examples decoding circuitry 103 may be included as part of primary controller 102 (not shown in FIG. 2).

In order to acknowledge receipt and correct decoding of the digital information, primary side 131 may withhold the control signal pulse for the first subsequent switching cycle after receiving the end of the digital information. In other words, for the next subsequent switching cycle after receiving and decoding digital information from secondary side 132, primary side controller 102 may withhold the control signal pulse for the first subsequent switching cycle. Secondary side 132 may determine that primary side controller 102 did not deliver the control signal pulse and interpret the lack of the control signal pulse as an acknowledgement (ACK) that primary side 131 correctly received the digital information. In this disclosure, the "control signal pulse" may also be referred to as a "PWM pulse."

In some examples, secondary controller 104 may not be configured to deliver a ZVS pulse during every cycle. For example, when the load connected to Vout 122 is in a low-power state, such as a sleep mode or similar low-power state, secondary controller 104 may skip generation of the ZVS pulse for one or more switching cycles because secondary controller 104 may detect that reduced power is needed from primary side 131. However, during digital communication, secondary controller 104 may override the status of Vout and provide a ZVS pulse during each cycle, even when the load is in a low-power state. In other words, the "no ZVS pulse skipping" behavior from secondary controller 104 may be implemented only during times of digital communication. At other times, when secondary side 132 does not need to send digital communication to primary side 131, secondary side 132 may skip ZVS pulses during selected switching cycles as needed, such as when the load is in a sleep state.

Pulse detector 128 may detect and measure the small changes in time period, e.g. reduced time period and extended time period, and decode the digital information encoded by secondary controller 104. In other words, pulse detector 128 may detect the switching time of the SR switch and decode the digital information based on the modulated period between the switching time of the SR switch. Though pulse detector 128 is depicted as a block separate from primary controller 102, in some examples pulse detector 128 may be included within primary controller 102. In some examples, pulse detector 128 may sense a different voltage than $V_{REFLECTED}$ 130, such as the drain-source voltage of primary side switch M1 110 or a voltage across an auxiliary winding of transformer W1 114.

Figure 3:
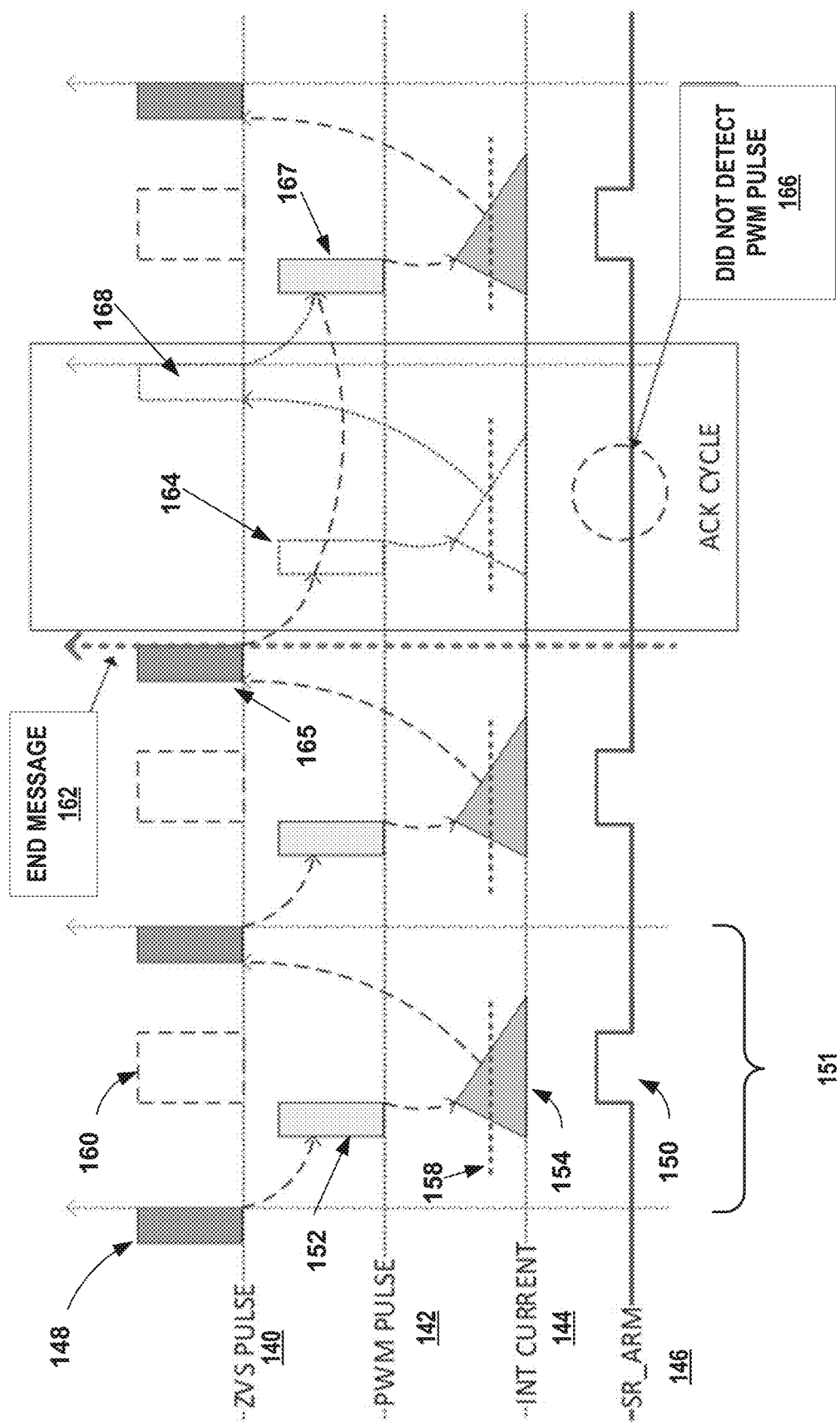
FIG. 3 is a timing diagram illustrating a power converter switching cycle including an ACK communication from the primary side to the secondary side according to one or more techniques of this disclosure.

FIG. 3 is a timing diagram illustrating a power converter switching cycle including an ACK communication from the primary side to the secondary side according to one or more techniques of this disclosure. The signals depicted in FIG. 3 are examples of signals produced by system 1 and power converter 100 described above in relation to FIGS. 1 and 2 during digital communication. The signals in FIG. 3 will be described in terms of power converter circuit 100 depicted in FIG. 2, unless otherwise noted. As described above in relation to FIG. 2, the example of FIG. 3 will focus on ZVS pulses, however other examples of signals generated by the secondary side may also apply to the techniques of this disclosure. For example, instead of pulses synchronized to a zero crossing point, the secondary side controller may generate pulses synchronized to other portions of the switching cycle.

FIG. 3 depicts several switching cycles 151. At the end of every switching cycle, the secondary side controller such as secondary controller 104 monitors the status of the Vout 122. When Vout 122 is lower than the programmed Vout threshold, secondary controller 104 may generate ZVS pulse 148 to signal to the primary side controller to turn on the M1 switch (M1 110). Secondary side controller may initiate ZVS switching by controlling the SR switch, as depicted in FIG. 2, and shown in ZVS pulse graph 140, which depicts ZVS pulse 148.

Primary side controller 102 may detect ZVS pulse 148 and trigger generation of PWM pulse 152 before of the end of switching period 151, as shown by PWM pulse graph 142. In some examples primary side controller may generate PWM pulse 152 immediately after the detection of the ZVS pulse. Primary side controller 102 may be configured to detect the switching of the SR switch based on a reflected voltage sensed on the primary winding of the power transformer.

The secondary side may detect the occurrence of PWM pulse 152 event by looking at the integrated current 154, as shown in INT current graph 144. The secondary side controller may include a circuit that integrates the voltage across the secondary transformer winding to monitor the integrated current 154. This circuit may be part of the secondary controller, which manages the SR functions. When integrated current 154 exceeds pre-defined threshold 158, secondary controller 104 may generate SR_ARM pulse 150, shown in SR_ARM graph 146. The power converter will repeat the sequence until the end of digital communication 162.

To implement an ACK response, from the primary side, as described above in relation to FIG. 1, decoding circuitry on the primary side may decode and validate the digital communication message. If the primary side determines the digital communication was correctly received, primary side controller 102 may just delay the generation of the PWM pulse for a complete switching cycle. For example, primary side controller would normally generate a PWM pulse (164) after detecting ZVS pulse 165. However, at the reception of the ZVS pulse belonging to the last switching cycle used to transmit the message (ZVS pulse 165), then the primary side controller may delay the PWM pulse, and instead trigger the generation of PWM pulse 167 in the following switching cycle. In other examples, the primary side controller may delay for two or more switching cycles before generating the PWM pulse. As described above in relation to FIG. 1, the delay for the control signal will support both discontinuous conduction mode and continuous conduction mode.

The secondary side may detect the missing PWM pulse (166) in the next switching cycle after transmitted message. In other words, the secondary side controller is configured to detect the control signal, e.g. the PWM pulses shown in graph 142. In response to detecting the delayed control signal, the secondary side controller may interpret the missing control signal, i.e. PWM pulse 164, as an acknowledgement and determine that the primary side controller has decoded the digital information.

In other examples, the decoding circuitry of primary side may not properly decode the digital information. Improper decoding may result from an incorrect validation check, e.g. the CRC code may be incorrect. Improper decoding may also result from interference or noise, a garbled transmission or by other causes. Whatever the cause, at the end of the message (162), the primary side controller may output the control signal, PWM pulse 164. In response to determining that the secondary side controller has completed sending the digital information and the secondary side controller detects that the primary side controller has sent a control signal in response to ZVS pulse 165 for the next subsequent switching cycle after the digital message has completed (162), then the secondary controller is configured to determine that the primary side controller did not decode the digital information. In other words, the secondary side controller may interpret the detected PWM pulse as the primary side controller sending a NACK.

As described above in relation to FIG. 1, in response to determining that the primary side controller did not decode the digital information, the secondary side controller may be configured to re-send the digital information. In some examples, the secondary side controller may be configured to re-send the digital information for a predetermined number of times. After re-sending the digital information the predetermined number of times, the secondary controller may be configured to stop sending the digital information and may set an error flag or otherwise communicate with a system controller or other device to indicate a digital communication error.

Figure 4A:
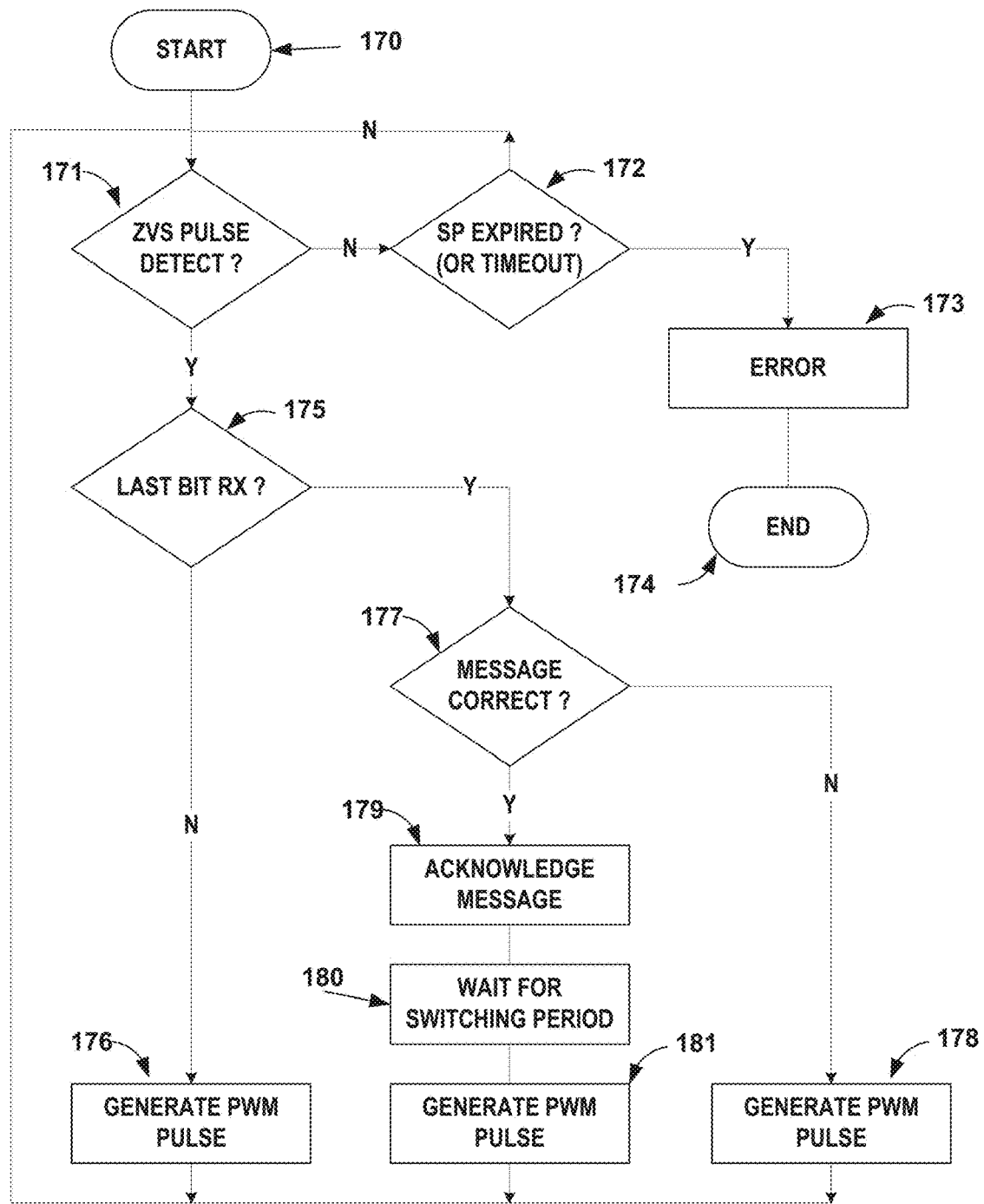
FIG. 4A is a flow diagram illustrating an example operation of a primary side of a power converter during digital communication with the secondary side, according to one or more techniques of this disclosure.

FIG. 4A is a flow diagram illustrating an example operation of a primary side of a power converter during digital communication with the secondary side, according to one or more techniques of this disclosure. The blocks of FIG. 4A will be described in terms of primary side 7 and primary side 131 described above in relation to FIGS. 1 and 2, as well as the timing diagram of FIG. 3.

As described above in relation to FIG. 3, at the end of every switching cycle, when Vout 122 is lower than the programmed Vout threshold, secondary controller 104 may generate ZVS pulse 148. At the start (170) of a switching cycle, the primary side controller may determine whether the behavior of the reflected voltage indicates a detecting ZVS pulse (171). In some examples, the primary side controller may detect an edge of the ZVS pulse, e.g. either a leading edge or a trailing edge. As described above in the example of FIG. 3, the trailing edge of ZVS pulse 148 is a falling edge and the leading edge is a rising edge. In other examples, the circuitry may be configured to deliver and detect a ZVS pulse in which the trailing edge is a rising edge and the leading edge is a falling edge.

If the primary controller detects no ZVS pulse and the switching period duration has not expired (172), the primary side controller may continue to monitor for the next ZVS pulse. In some examples, the primary side controller may not detect the ZVS pulse (171) and the switching period, e.g. switching period 151, has expired (YES branch of 172). The primary side controller may flag an error (173) and end (174).

When the primary side controller detects a ZVS pulse (YES branch of 171), indicating an SR switching event, the primary side controller, or in some examples, decoding circuitry operatively coupled to the primary side controller, may determine whether the last bit of a digital communication message from the secondary side has been sent (175). In other words, the primary side may receive digital information based on the detected ZVS pulse, as described above in relation to FIGS. 1 and 2. When the digital communication is still in progress and the last bit has not been received by the primary side controller (NO branch of 175), the primary side controller may generate a PWM pulse. In some examples, no digital communication may be in progress, and therefore the primary side controller may also generate the PWM pulse (176) upon detection of the ZVS pulse (171).

When the last bit of the digital message has been received (YES branch of 175), the decoding circuitry may validate the message to determine whether the message is correct (177), e.g. determining whether the decoded digital information is valid digital information. If the message is not correct (NO branch of 177), the primary side controller may generate a PWM pulse (178), indicating a NACK to the secondary side.

When the digital message is correct (YES branch of 177), the decoding circuitry may acknowledge the message by withholding the PWM pulse for the next subsequent switching cycle after the digital message has completed (179). The primary side controller may wait for the next switching period (180) and generate the PWM pulse (181), as described above for PWM pulse graph 142 in FIG. 3. In other words, in response to determining that the decoded digital information is valid digital information, the primary side controller may delay the PWM control signal for a one switching period, aka switching cycle. The primary side controller may resume generating the control signal on the subsequent switching period, and future switching periods, in response to detecting a ZVS pulse.

Figure 4B:
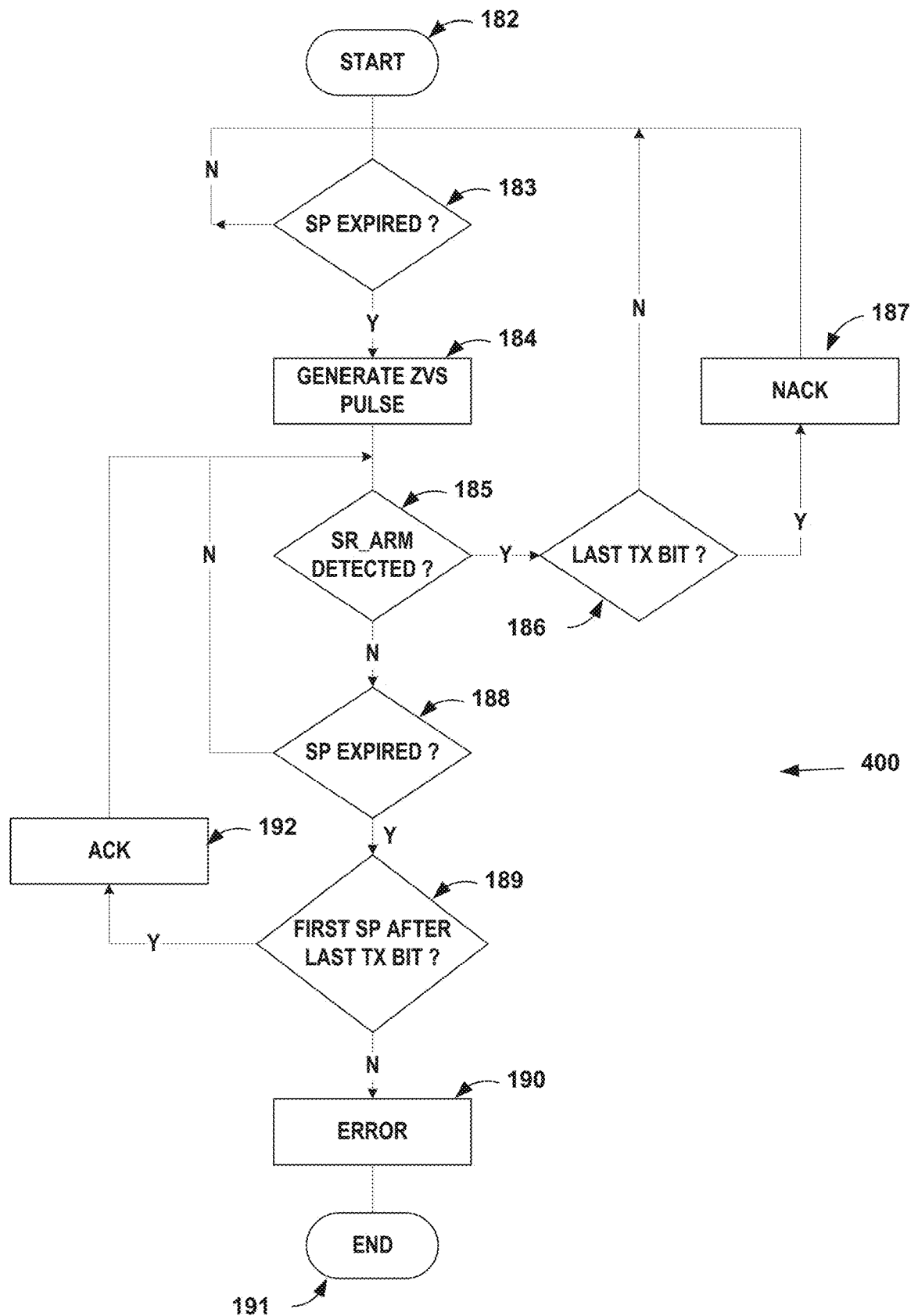
FIG. 4B is a flow diagram illustrating an example operation of a secondary side of a power converter during digital communication with the secondary side, according to one or more techniques of this disclosure.

FIG. 4B is a flow diagram illustrating an example operation of a secondary side of a power converter during digital communication with the secondary side, according to one or more techniques of this disclosure. The blocks of FIG. 4B will be described in terms of primary side 7 and primary side 131 described above in relation to FIGS. 1 and 2, as well as the timing diagram of FIG. 3.

During digital communication, the secondary controller starts (182) by monitoring the duration of the switching period, SP, (183). As described above in relation to FIG. 2, during digital communication, the secondary controller generates a ZVS pulse (184), even when Vout is above the predetermined Vout threshold.

When integrated current 154, depicted in FIG. 3, exceeds the pre-defined threshold 158, circuitry within the secondary controller may generate an SR_ARM pulse 150, shown in SR_ARM graph 146. Therefore, when the primary side generates the PWM pulse, the integrated current will increase causing the SR_ARM pulse on the secondary side. When the secondary controller detects the SR_ARM pulse (YES branch of 185), the secondary controller may verify whether the last bit of a digital communication message has been transmitted, TX, (186).

In some examples, when the secondary controller detects an SR_ARM pulse (YES branch of 186) during digital communication in the next switching period after the last bit has been transmitted (186), the secondary controller may interpret the detected SR_ARM pulse as receiving a NACK from the primary side (187). In other examples, the secondary controller detects an SR_ARM pulse (185) and the last bit of the message has not yet been transmitted (NO branch of 186), the secondary controller may continue to monitor the switching period duration (183) and generate the next ZVS pulse (184). In other words, when digital communication is in progress, the secondary controller does not interpret the detected SR_ARM pulse, indicating a PWM pulse from the primary side, as a NACK. As shown in FIG. 3, in some examples, the secondary controller may generate the ZVS pulse (184) such that the end of the ZVS pulse approximately coincides with the start of the next switching period.

When the secondary controller detects no SR_ARM (NO branch of 185), the secondary controller may verify whether the switching period has expired (188). When the switching period is still in progress (NO branch of 188), the secondary controller may continue to monitor for the SR_ARM pulse (185). When the switching has expired, (YES branch of 188), the secondary controller may verify whether the missing SR_ARM pulse was during the first switching period after the last transmitted bit of the digital communication message (189).

In some examples, the secondary controller detects no SR_ARM event during a switching period, either while digital communication is in progress, or when no digital communication is being transmitted from the secondary to the primary (e.g. NO branch of 189), then the secondary controller may flag an error (190). In some examples, the secondary controller may end operations (191), such as for circuit protection. In other examples, the secondary controller may perform other actions, such as communicate to a system controller or some other device (not shown in FIG. 4B).

In other examples, the secondary controller may determine the missing SR_ARM event occurred in the first switching period after the last transmitted bit (YES branch of 189) and interpret the missing SR_ARM event as an ACK from the primary side (192).

Figure 5:
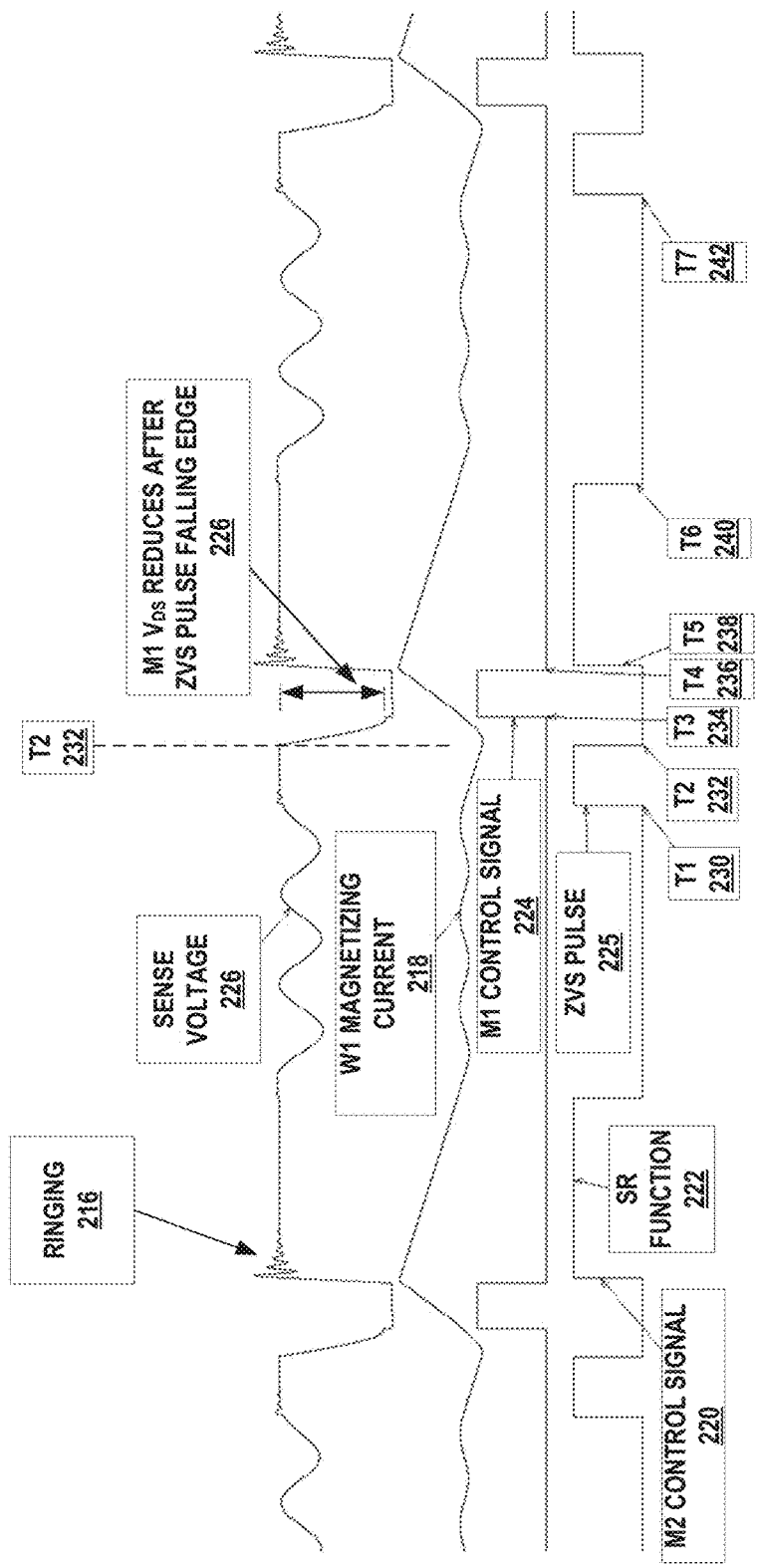
FIG. 5 is a timing diagram illustrating an example operation of a power converter circuit that includes a ZVS pulse detection circuit, according to one or more techniques of this disclosure.

FIG. 5 is a timing diagram illustrating an example operation of a power converter circuit that includes a ZVS pulse detection circuit, according to one or more techniques of this disclosure. The example of FIG. 5 depicts an example of a switching cycle of a flyback power converter, similar to power converter 100 described above in relation to FIG. 2. The description of the timing diagram of FIG. 5 may refer to components in The timing diagram of FIG. 5 depicts sense voltage 226 as the topmost curve, the power transformer (W1) magnetizing current, 218, primary switch (M1) control signal 224 and secondary switch (M2) control signal 220. Sense voltage curve 226 corresponds to the magnitude of voltage over time of $V_{REFLECTED}$ 130 as measured at $V_{SENSE}$ terminal 126, depicted in FIG. 2. W1 magnetizing current 218 corresponds to the magnitude of current over time of IMAG 124, as well as a corresponding magnetizing current on the secondary winding of transformer W1 114. M1 control signal 224 corresponds to the output of primary controller 102 connected to the gate of primary transistor M1, 110. M2 control signal 220 corresponds to the output of secondary controller 104 connected to the gate of SR switch M2, 112.

The power converter switching cycle starts as the time T1 230. At time T1 230 SR switch M2 112 is turned on to generate ZVS pulse 225. W1 magnetizing current starts to build up in the negative direction. Using the Vsense voltage waveform 226, primary side 131, by using pulse detector 128 and primary controller 102, may can detect the ZVS pulse 225 event.

At the time T2, SR switch M2 112 is turned off when M2 control signal 220 goes from high to low at the end of the ZVS pulse 225 event. After SR switch M2 112 turns off, the negative transformer magnetizing current (primary side) 218 recharges the Vds capacitance of primary side switch M1 110 (226).

At the time T3, the drain-source voltage, Vds, of primary side switch M1 110 is minimal, because M1 control signal 224 goes from low to high and primary side switch M1 110 is turned ON. As primary side switch M1 110 turns on, W1 magnetizing current 218 starts to increase in a positive direction.

At the time T4, transformer magnetizing current reached a desired setpoint level, M1 control signal 224 goes from high to low and primary side switch M1 110 is turned OFF. Transformer magnetizing current (secondary side) 218 is redirected to the body diode of SR switch 112, and starts to charge the output capacitor, e.g. capacitor C2 120. In some examples, reaching the desired setpoint level may be controlled by a peak current control or by a time-based PWM control, or some other type of output control technique.

At the time T5, SR switch M2 112 is switched ON to reduce the rectifier voltage drop and to improve the efficiency. This is also depicted as SR function 222 for a previous switching cycle to the switching cycle described by T1-T6.

At the time T6, SR switch M2 112 is switched OFF. Switching cycle is completed and primary side controller 102 waits for next ZVS pulse event. At the time T7, next switching cycle is started.

In the example of FIG. 5, a low to high transition on the transistor control signal, e.g. 224 or 220, turns ON a transistor. In other examples, such as in the case of a negative voltage power supply, the signals of FIG. 5, i.e., negative vs. positive and high vs. low transitions may configured in a different manner.

Figure 6:
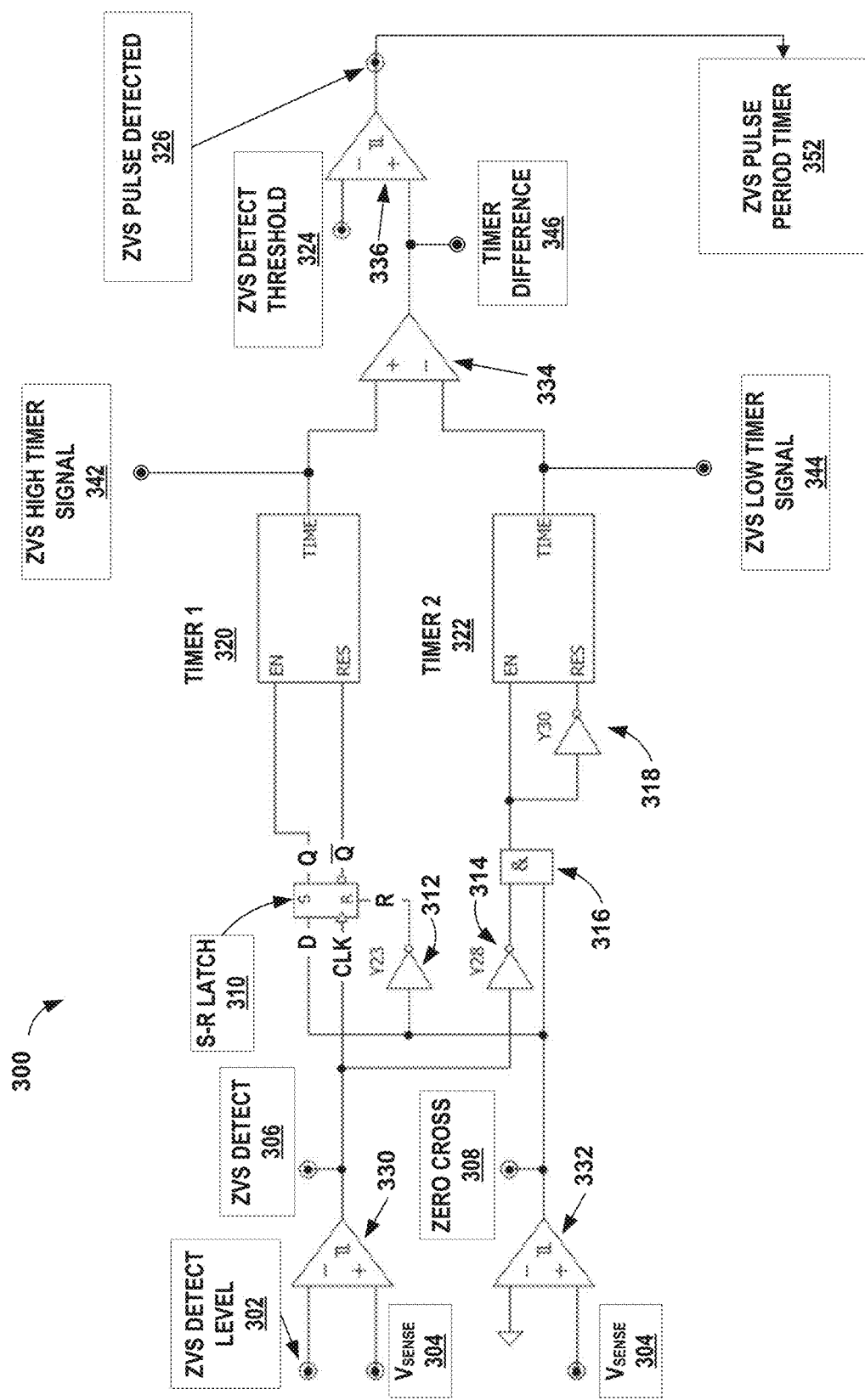
FIG. 6 is a schematic diagram illustrating one example implementation of ZVS detection and zero voltage crossing detection, according to one or more techniques of this disclosure.

FIG. 6 is a schematic diagram illustrating one example implementation of ZVS detection and zero voltage crossing detection, according to one or more techniques of this disclosure. Pulse detector 300 is one example implementation of pulse detector 128 depicted in FIG. 2. In some examples, pulse detector 300 may be incorporated into a primary side controller, such as primary controller 102 depicted in FIG. 2.

Example pulse detector 300 uses two comparators 330 and 332 for the operation. Comparator 332 is part of a zero cross detection circuit and comparator 330 detects the ZVS event as described above in relation to FIG. 5.

The zero cross detection circuit may include comparator 332, timer 2 322, and one or more logic gates, such as inverter 314, AND gate 316, and inverter 318. The inverting input of comparator 332 connects to a zero reference voltage, e.g. circuit ground, and the non-inverting input of comparator 332 connects to Vsense 304. Vsense 304 corresponds to $V_{REFLECTED}$ 130 as measured at the Vsense 126 input of pulse detector 128, as depicted in FIG. 2. The output of comparator 332 is the zero cross signal 308, which connects to AND gate 316. Zero cross signal 308 connects to the Set input of SR latch 310 directly as well as the Reset input of SR latch 310 through NOT gate Y23 (312). The output of AND gate 316 connects to the Enable input of timer 2 322 as well as to the Reset input of timer 2 322 through NOT gate Y30 (318). The output of timer 2 322 is the ZVS low timer signal 344, which connects to the inverting input of an op amp configured as a subtraction circuit 334.

The ZVS detection circuit may include comparator 330, S-R latch 310, inverter 312 and timer 1 320. In the example of FIG. 6, comparator 330 has a non-inverting input connected to the same Vsense 304 input as the non-inverting input to comparator 304. The inverting input to comparator 330 connects to a voltage threshold for ZVS detection level 302. The output of comparator 330 is the ZVS detection signal 306. ZVS detection signal 306 indicates when the reflected voltage signal, e.g. $V_{REFLECTED}$ 130 depicted in FIG. 2, is less than a predetermined threshold voltage, i.e. ZVS detection level 302, where ZVS detection level 302 threshold is greater than zero volts.

The output of comparator 330 connects to the clock input of clocked SR latch 310 as well to AND gate 316 through NOT gate Y28 (314). The non-inverted output Q of SR latch 310 connects to the Enable input of timer 1 320. The inverted output not-Q (Q̄) as connects to the Reset input of timer 1 320. The output of timer 1 320 is the ZVS high timer signal 342, which connects to the non-inverting input of the op amp configured as a subtraction circuit 334.

The output of subtraction circuit 334 is timer difference signal 346. Timer difference signal 346 is ZVS low timer signal 344 (from the zero cross detection circuit) subtracted from ZVS high timer signal 342 (from the ZVS event detection circuit). Timer difference signal 346 connects to the non-inverting input of comparator 336 and is compared to a ZVS detection threshold 324 connected to the inverting input of comparator 336. ZVS detect threshold 324 should not be confused with ZVS detection level 302, though both voltage thresholds have a similar name in this disclosure. ZVS detect threshold 324 may also be considered a ZVS event detection threshold. The output of comparator 336 is the ZVS detected signal 326.

In operation, example pulse detector 300 may use the two comparators 330 and 332 for the SR switching detection operation. One of the comparators, comparator 332, detects the Vsense zero crossing, and the other comparator 330 detects when the Vsense level is above a threshold (ZVS detect level 302), which is set to be slightly below the desired reflected output voltage. The desired reflected output voltage is the voltage setpoint for the power to be output to the load, such as load 4 depicted in FIG. 1.

ZVS detect level 302 threshold at the inverting input of comparator 330 is a voltage very close to the desired reflected output voltage. Because of small variations in the output voltage, the sensed voltage (Vsense 304) may cross the threshold ZVS detect level 302 many times during a switching cycle. This may mean that the ZVS detect signal 306 may be difficult to analyze. However, the signal from the zero cross comparator 332, i.e. zero cross signal 308, may be stable in comparison to ZVS detect signal 306 and therefore zero cross signal 308 may be used to qualify ZVS detector comparator signal.

Pulse detector 300 may use the two timers, i.e. TIMER 1 320 and TIMER 2 322, for the signal qualification of ZVS detect signal 306. TIMER 1 320 starts counting on the first rising edge of the ZVS detector comparator signal, ZVS detect signal 306, and TIMER 1 320 will continue to count until the falling edge of the output of zero cross comparator 332, i.e. zero cross signal 308. In other words, TIMER 1 320 is configured to output an amount of time between each instance when the reflected voltage signal momentarily exceeds the predetermined threshold voltage, ZVS detect level 302, and when the reflected voltage signal becomes less than approximately zero volts.

TIMER 2 322 begins counting when zero cross signal 308 is high but ZVS detector comparator signal 306 is low. The difference between the two counters, i.e. the output of subtraction circuit 334 (timer difference signal 346) represents the amount of time the voltage across the SR switch was close to zero, e.g. SR switch M2 112 depicted in FIG. 2. In other words, TIMER 2 322 is configured to output an amount of time when both: (a) the output from the zero cross circuit indicates that the reflected voltage signal, Vsense 304, is greater than approximately zero volts; and the output from the ZVS detection circuit, ZVS detect 306, indicates that the reflected voltage signal, Vsense 304, exceeds the predetermined threshold voltage, ZVS detect level 302.

Subtraction circuit 334 may be configured to subtract the output of TIMER 2 322 from the output of TIMER 1 320 and output a subtraction result. By comparing timer difference signal 346 with ZVS detect threshold 324 results in pulse detection circuit 300 reliably detecting the ZVS pulse (i.e. ZVS event) from SR switch on the secondary side. In other words, the primary side controller, such as primary controller 102 depicted in FIG. 2, is configured to detect the switching time of the SR switch, i.e. SR switch M2 112, based on a reflected voltage as sensed on a primary winding ($V_{SENSE}$ 126) of the power transformer. Pulse detector circuit, 300, which may be coupled to primary controller 102 is configured to compare the subtraction result, timer difference 346, to a predetermined subtraction threshold ZVS detect threshold 324. Based on timer difference 346 satisfying ZVS detect threshold 324, pulse detection circuit 300 will indicate a detection of the switching time of secondary side SR switch in the output of ZVS detected signal 326.

Figure 7:
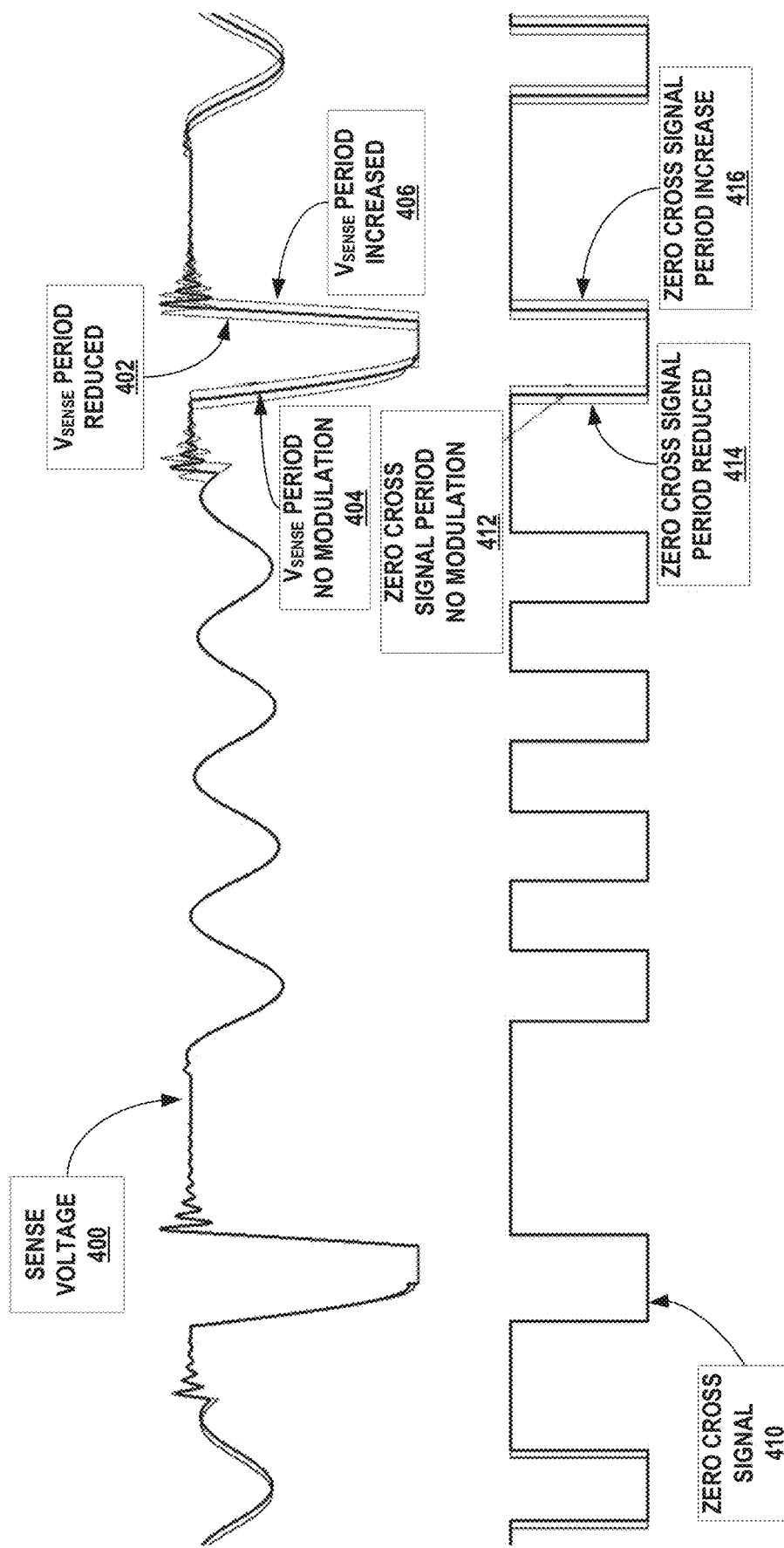
FIG. 7 is a timing diagram illustrating ZVS period modulation to communicate between the secondary side and primary side of a power converter according to one or more techniques of this disclosure.

FIG. 7 is a timing diagram illustrating ZVS period modulation to communicate between the secondary side and primary side of a power converter according to one or more techniques of this disclosure. As described above, for example in relation to FIG. 2, the secondary side controller may encode digital information by modulating a period between the switching time of the SR switch. The secondary side controller may increase the period or decrease the period. In some examples the secondary side may modulate the timing by increasing (or decreasing) the period in multiple levels. For example, the secondary side may modulate the period with four levels, such as a small increase in period and a large increase in period along with a small decrease and a large decrease in period. In some examples, the encoding scheme may include no modulation, along with the increase or decrease in period. The primary side may detect the increase in period or decrease in period, such as with a pulse detector circuit described above in relation to FIGS. 2 and 4.

The timing diagram of FIG. 7 includes sense voltage waveform 400 and zero cross signal waveform 410. Sense voltage waveform 400 may correspond to $V_{REFLECTED}$ 130 sensed on the primary winding as measured at $V_{SENSE}$ terminal 126, depicted in FIG. 2 as well as $V_{SENSE}$ 304 depicted in FIG. 6. Zero cross signal waveform 410 is an example depiction of a signal that may be measured at zero cross signal 308, i.e. the output of comparator 332 as described above in relation to FIG. 6.

With no modulation, the timing of sense voltage waveform 400 follows the curve indicated by 404, $V_{SENSE}$ period—no modulation. Similarly, zero cross signal waveform 410 follows the curve indicated by 412, zero cross signal—no modulation.

In the example in which the SR switch controller on the secondary side shortens the period between the switching time of the SR switch, the timing of the reflected voltage measured as $V_{SENSE}$ 400 changes to follow the curve indicated by 402, $V_{SENSE}$ period reduced. Similarly, zero cross signal 410, which is monitoring $V_{SENSE}$ 400, will also show a reduced period (414).

In the example in which the SR switch controller on the secondary side increases the period between the switching time of the SR switch, the timing of $V_{SENSE}$ 400 changes to follow the curve indicated by 406, $V_{SENSE}$ period increased. Similarly, zero cross signal 410, which is monitoring $V_{SENSE}$ 400, e.g. via comparator 332 described above in relation to FIG. 6, will also show an increased period (416).

Figure 8:
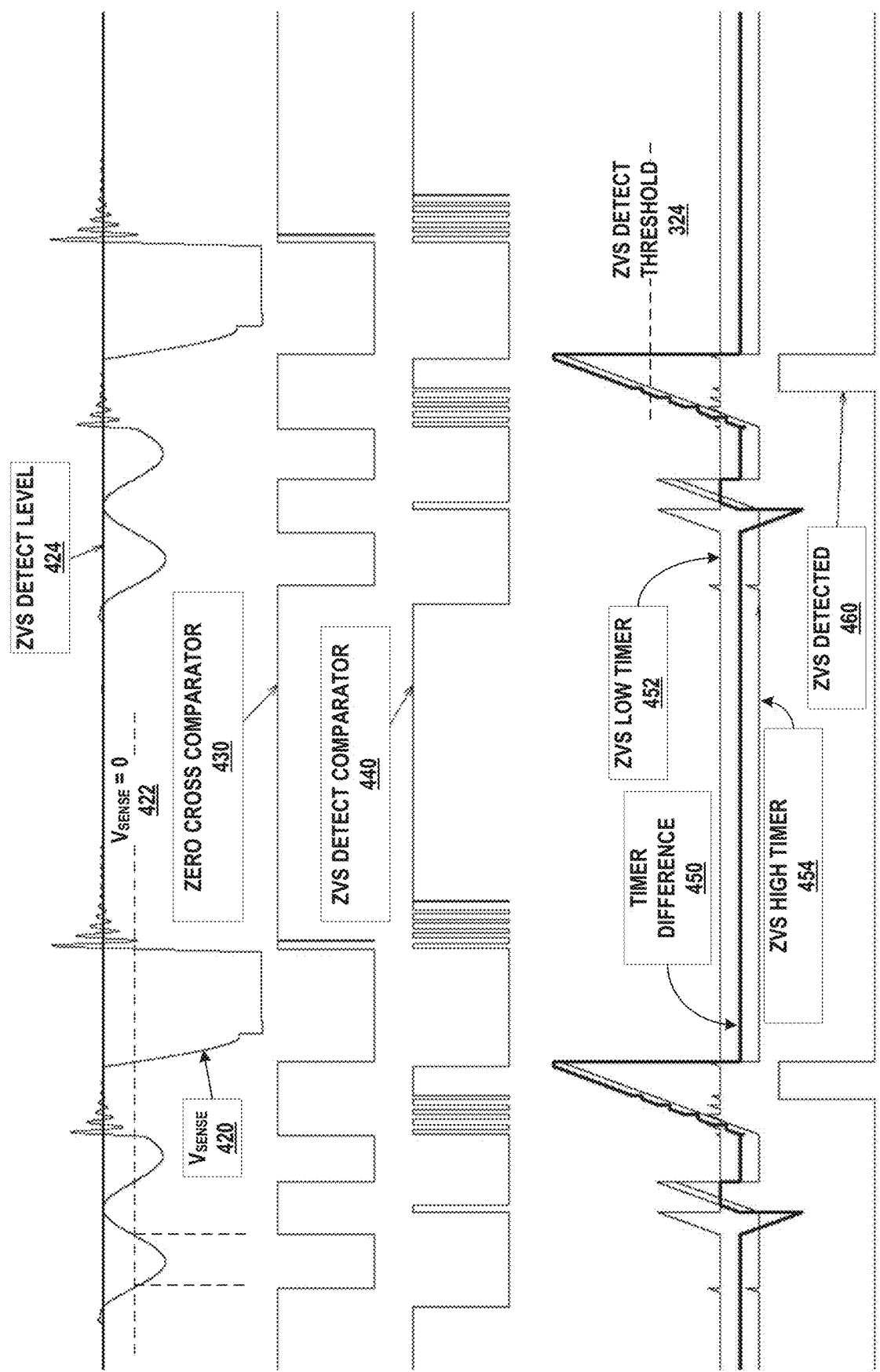
FIG. 8 is a timing diagram illustrating an example implementation of ZVS pulse detection by the example configuration of the pulse detector of FIG. 5.

FIG. 8 is a timing diagram illustrating an example implementation of ZVS pulse detection by the example configuration of the pulse detector of FIG. 6. The description of the signals in FIG. 8 will refer to components of pulse detector 300 depicted in FIG. 6.

As shown by the timing diagram of FIG. 8, a pulse detector circuit of this disclosure, such as pulse detector 300, may compare the timing of the $V_{SENSE}$ 420 waveform, the zero cross comparator 430 waveform, the ZVS detect comparator 440 waveform, the ZVS low timer 452 waveform, the ZVS high timer 454 waveform, the timer difference 450 waveform and the ZVS detected 460 waveform. The period of the switching cycle for a power converter, such as power converter described above in relation to FIG. 2, is the time between the falling edges of the ZVS detected signal 460. Because the falling edge of ZVS detected signal 460 is synchronized with the stable zero cross comparator 430 signal, ZVS detected signal 460 is also stable and may be used for high resolution detection of the SR switch timing.

$V_{SENSE}$ 420 waveform may correspond to sense voltage 400 waveform of FIG. 8, $V_{SENSE}$ 304 depicted in FIG. 6 and to $V_{SENSE}$ 126 depicted in FIG. 2. ZVS detect level 424 may be set just below the desired reflected output voltage. As described above in relation to FIG. 2, the reflected output voltage is the output voltage, e.g. $V_{OUT}$ 122, as measured on the primary side of the power transformer, e.g. transformer W1 114 depicted in FIG. 2. ZVS detect level 424 waveform corresponds to ZVS detect level 302 input to comparator 330, depicted in FIG. 6. When $V_{SENSE}$ 420 goes below ZVS detect level 424, then ZVS detect comparator 440, i.e. the output of comparator 330. goes from high to low. As described above, the signals of FIG. 6 are just one example based on the example configuration of pulse detector 300. In other examples, comparator 330, or other components, may be configured to switch from low to high, rather than high to low.

The $V_{SENSE}$=0 level 422 indicates where V$SENSE$ 420 waveform crosses zero. When $V_{SENSE}$ 420 is greater than zero, zero cross comparator 430 waveform is high. When $V_{SENSE}$ 420 is less than zero, zero cross comparator 430 waveform is low.

As described above in relation to FIG. 6, ZVS high timer 454 waveform begins increasing as TIMER 1, 320, begins counting, which is when zero cross comparator 430 waveform is high but ZVS detector comparator 440 waveform is low. ZVS low timer 452 waveform begins increasing when TIMER 2, 322 begins counting, which is when zero cross comparator 430 waveform is high but ZVS detector comparator 440 waveform is low Timer difference 450 waveform is the output of subtraction circuit 334, which is configured to subtract ZVS low timer 452 waveform from ZVS high timer 454 waveform. When the value of timer difference 450 waveform satisfies the ZVS detect threshold 324 (also depicted in FIG. 6), the pulse detector circuit 300 indicates a ZVS pulse event detection, i.e. as generated by the SR switch.

In this manner, pulse detector circuit 300 may determine the timing of the period of the switching cycle for the power converter as the time between the falling edges of the ZVS detected signal 460. Communication is established from the secondary side of the power converter to the primary side by the modulating the period between the ZVS pulse time on the secondary side. The operation of pulse detector 300, according to the waveforms depicted in FIG. 6, is one example technique for the primary side to detect the ZVS pulse and decode the communication. In some examples, decoding the communication may include a third timer circuit, ZVS pulse period timer 352, to measure the length of each period and determine if a period is, for example a reduced period or an increased period.

The digital information may be encoded and decoded based on a variety of coding techniques. Some examples may include a differential coding scheme, or some other type of digital coding. In some examples, primary side controller circuit may include a timer, such as ZVS pulse period timer 352 depicted in FIG. 6, to determine the length of each period, e.g. a reduced period or an increased period. The timer may be a circuit or may be a function executed by processing circuitry that may be included in the primary side controller. A timer function executed by processing circuitry may still be considered a timer circuit because the timer is implemented by circuitry.

In one or more examples, the functions described above may be implemented in hardware, software, firmware, or any combination thereof. For example, some components of FIG. 2, such as primary controller 102 and secondary controller 104 may be implemented in hardware, software, firmware, or any combination thereof. If implemented in software, the functions may be stored on or transmitted over, as one or more instructions or code, a computer-readable medium and executed by a hardware-based processing unit. In this disclosure, primary side controller 102 and secondary side controller 104 may also be referred to as controller circuitry.

By way of example, and not limitation, such computer-readable storage media may comprise RAM, ROM, EEPROM, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The techniques of this disclosure may also be described in the following examples:

Example 1. A system comprising: an isolated power converter, a secondary side controller configured to: control a synchronous rectification (SR) switch of the power converter, wherein the secondary side controller is configured to initiate a signal by controlling the SR switch and encode digital information by modulating the switching of the SR switch. The system further comprises a primary side controller configured to: control a primary side switch of the power converter with a control signal, detect the switching of the SR switch, decode the digital information based on the modulated period between the switching time of the SR switch and in response to decoding the digital information, delay the control signal.

Example 2. The system of example 1, wherein the secondary side controller is configured to detect the control signal and in response to detecting the delayed control signal, determine that the primary side controller has decoded the digital information.

Example 3. The system of any combination of examples 1 and 2, wherein the secondary side controller is configured to detect the control signal and in response to determining that: the secondary side controller has completed sending the digital information; and the secondary side controller detects that the primary side controller has sent a control signal for the next subsequent switching cycle after the secondary controller has transmitted a final bit in the digital information, then the secondary controller is configured to determine that the primary side controller did not decode the digital information.

Example 4. The system of any combination of examples 1-3, wherein in response to determining that the primary side controller did not decode the digital information, the secondary side controller is configured to re-send the digital information.

Example 5. The system of any combination of examples 1-4, wherein the secondary side controller is configured to re-send the digital information for a predetermined number of times; and in response to re-sending the digital information the predetermined number of times, the secondary controller is configured to stop sending the digital information.

Example 6. The system of any combination of examples 1-5, wherein in response to re-sending the digital information the predetermined number of times, the secondary controller is configured to set an error flag.

Example 7. The system of any combination of examples 1-6, wherein the isolated power converter comprises a power transformer, wherein the secondary side controller is electrically coupled to a gate of the SR switch; and wherein the primary side controller is configured to detect the switching of the SR switch based on a reflected voltage sensed on a primary winding of the power transformer.

Example 8. The system of any combination of examples 1-7, wherein the primary side controller comprises: a zero cross detection circuit, wherein the zero cross detection circuit detects when a reflected voltage signal is greater than approximately zero volts; and a ZVS detection circuit, wherein the ZVS detection circuit detects when the reflected voltage signal is less than a predetermined threshold voltage, wherein the predetermined threshold voltage is greater than zero volts.

Example 9. The system of any combination of examples 1-8, wherein the signal initiated by the secondary side controller comprises a pulse generated by controlling the SR switch.

Example 10. The system of any combination of examples 1-9, wherein the pulse is a zero voltage switching (ZVS) pulse.

Example 11. A device comprising: a pulse detection circuit, decoding circuitry configured: to receive digital information based on the detected ZVS pulse, decode the digital information, wherein the device is further configured to: control a primary side switch of a power converter by sending a control signal pulse during a switching cycle in response to decoding the digital information, withhold the control signal pulse.

Example 12. The device of example 11, wherein the pulse detection circuit is a zero voltage switching (ZVS) pulse detection circuit configured to detect a ZVS pulse.

Example 13. The device of any of examples 11 and 12, or any combination thereof, wherein the device is further configured to: determine whether the received digital information is valid; and in response to determining that the digital information is valid, withhold the control signal pulse for the first switching cycle after receiving a final bit of the digital information.

Example 14. The device of any combination of examples 11-13, wherein the decoding circuitry is configured to determine whether the digital information is valid based on a validation code included with the digital information.

Example 15. The device of any combination of examples 11-14, wherein in response determining that the digital information is not valid, the device is configured to send the control signal during the first switching cycle after receiving the end of the digital information.

Example 16. The device of any combination of examples 11-15, wherein the pulse detection circuit is configured to detect a falling edge of the pulse.

Example 17. The device of any combination of examples 11-16, wherein the pulse detection circuit comprises a zero cross detection circuit, wherein the zero cross detection circuit detects when a reflected voltage signal is greater than approximately zero volts; and a zero voltage switching (ZVS) detection circuit, wherein the ZVS detection circuit detects when the reflected voltage signal is less than a predetermined threshold voltage, wherein the predetermined threshold voltage is greater than zero volts.

Example 18. A method comprising detecting, by a controller circuitry, an edge of a pulse, receiving, by the controller circuitry, digital information based on the detected pulse; decoding, by the controller circuitry, the digital information based on the detected pulse; and determining whether the decoded digital information is valid digital information; in response to determining that the decoded digital information is valid digital information, delaying, by the controller circuitry a control signal.

Example 19. The method of example 18, wherein the controller circuit is configured to control a primary side switch of a power converter.

Example 20. The method of any combination of examples 18-19, wherein delaying the control signal comprises delaying the control signal for a first switching period after receiving a final bit of the digital information.

Example 21. The method of any combination of examples 18-20, further comprising resuming, by the controller, the control signal on the subsequent switching cycle.

Example 22. The method of any combination of examples 18-21, further comprising, determining, by the controller circuitry, whether the digital information is valid based on a validation code included with the digital information.

Example 23. The method of any combination of examples 18-22, wherein in response determining that the digital information is not valid, sending, by the controller circuitry, the control signal during the first switching cycle after receiving a final bit of the digital information.

Example 24. The method of any combination of examples 18-23, wherein detecting the pulse comprises: detecting, by the controller circuitry, when a reflected voltage signal is greater than approximately zero volts; and detecting, by the controller circuitry, when the reflected voltage signal is greater than a predetermined threshold voltage, wherein the predetermined threshold voltage is greater than zero volts Example 25. A device comprising a secondary side controller configured to: control a synchronous rectification (SR) switch of a power converter, generate a signal by controlling the SR switch, and encode digital information by modulating the switching of the SR switch, monitor an output current of the power converter, detect a switching time of a primary side switch of the power converter based on the monitored output current, in response to detecting that the switching time has been delayed, determine that a primary side controller of the power converter has decoded the digital information.

Example 26. The device of example 25, wherein determining that the switching time has been delayed comprises determining that the switching time of the primary switch has been delayed for one full switching cycle after initiating the zero voltage switching.

Example 27. The device of any of examples 25 and 26 or any combination thereof, wherein the secondary side controller in response to determining that: the secondary side controller has completed sending the digital information; and the secondary side controller detects that switching time of the primary side switch is within the next subsequent switching cycle after sending a final bit of the digital information, the secondary controller is configured to determine that the primary side controller did not decode the digital information.

Example 28. The device of any combination of examples 25-27, wherein in response to determining that the primary side controller did not decode the digital information, the secondary side controller is configured to re-send the digital information.

Example 29. The device of any combination of examples 25-28, wherein the secondary side controller is configured to re-send the digital information for a predetermined number of times; and in response to re-sending the digital information the predetermined number of times, the secondary controller is configured to stop sending the digital information.

The device of any combination of examples 25-29, wherein the signal generated by controlling the SR switch comprises a zero voltage switching (ZVS) pulse.

Various examples of the disclosure have been described. These and other examples are within the scope of the following claims.

The invention claimed is:

1. A method comprising:
   detecting, by a controller circuitry, a pulse,
   receiving, by the controller circuitry, digital information based on the detected pulse;
   decoding, by the controller circuitry, the digital information based on the detected pulse; and
   determining whether the decoded digital information is valid digital information;
   in response to determining that the decoded digital information is valid digital information, delaying, by the controller circuitry a control signal, wherein delaying the control signal comprises delaying the control signal for a first switching period after receiving a final bit of the digital information.

2. The method of claim 1, wherein the controller circuitry is configured to control a primary side switch of a power converter with the control signal.

3. The method of claim 1, wherein the pulse comprises a zero voltage switching (ZVS) pulse detected by a primary side of a power converter.

4. The method of claim 1, further comprising resuming, by the controller circuitry, the control signal on a subsequent switching period to the first switching period.

5. The method of claim 1, further comprising, determining, by the controller circuitry, whether the digital information is valid based on a validation code included with the digital information.

6. The method of claim 1, wherein in response to determining that the digital information is not valid, sending, by the controller circuitry, the control signal during the first switching period after receiving a final bit of the digital information.

7. The method of claim 1, wherein detecting the pulse comprises:
   detecting, by the controller circuitry, when a reflected voltage signal is greater than approximately zero volts; and
   detecting, by the controller circuitry, when the reflected voltage signal is greater than a predetermined threshold voltage, wherein the predetermined threshold voltage is greater than zero volts.

8. A device comprising:
   a pulse detection circuit; and
   decoding circuitry configured:
   to receive digital information based on the detected pulse; and
   decode the digital information;
   wherein the device is further configured to:
   control a primary side switch of a power converter by sending a control signal during a switching period, and
   in response to decoding the digital information and determining that the digital information is valid, withhold the control signal after receiving a final bit of the digital information, wherein to withhold the control signal comprises to withhold the control signal for a first switching period after receiving a final bit of the digital information.

9. The device of claim 8, wherein the decoding circuitry is configured to determine whether the digital information is valid based on a validation code included with the digital information.

10. The device of claim 8, wherein in response determining that the digital information is not valid, the device is configured to send the control signal during the first switching period after receiving the final bit of the digital information.

11. The device of claim 8, wherein the pulse detection circuit is configured to detect an edge of a zero voltage switching (ZVS) pulse.

12. The device of claim 8, wherein the pulse detection circuit comprises
   a zero cross detection circuit, wherein the zero cross detection circuit detects when a reflected voltage signal is greater than approximately zero volts; and
   a zero voltage switching (ZVS) detection circuit, wherein the ZVS detection circuit detects when the reflected voltage signal is less than a predetermined threshold voltage, wherein the predetermined threshold voltage is greater than zero volts.

13. A device comprising a secondary side controller configured to:
   control a synchronous rectification (SR) switch of a power converter;
   generate a signal by controlling the SR switch;
   encode digital information by modulating the switching of the SR switch;
   monitor an output current of the power converter;
   detect a switching time of a primary side switch of the power converter based on the monitored output current;
   in response to detecting that the switching time has been delayed, determine that a primary side controller of the power converter has decoded the digital information.

14. The device of claim 13, wherein determining that the switching time has been delayed comprises determining that the switching time of the primary switch has been delayed for one full switching cycle after initiating the zero voltage switching.

15. The device of claim 13, wherein the secondary side controller in response to determining that:
   the secondary side controller has completed sending the digital information; and
   the secondary side controller has detected that switching time of the primary side switch is within the next subsequent switching cycle after the digital message has completed;
   then the secondary controller is configured to determine that the primary side controller did not decode the digital information.

16. The device of claim 15, wherein in response to determining that the primary side controller did not decode the digital information, the secondary side controller is configured to re-send the digital information.

17. The device of claim 16, wherein:
the secondary side controller is configured to re-send the digital information for a predetermined number of times; and
in response to re-sending the digital information the predetermined number of times, the secondary controller is configured to stop sending the digital information.

18. The device of claim 13, wherein the signal generated by controlling the SR switch comprises a zero voltage switching (ZVS) pulse.

* * * * *